(12) United States Patent
Löhl

(10) Patent No.: US 6,200,126 B1
(45) Date of Patent: Mar. 13, 2001

(54) INJECTION MOULDING MACHINE

(75) Inventor: Rüdiger Löhl, Halver (DE)

(73) Assignee: Dr. Boy GmbH (DE)

( * ) Notice: Subject to any disclaimer, the term of this patent is extended or adjusted under 35 U.S.C. 154(b) by 0 days.

(21) Appl. No.: 09/233,684

(22) Filed: Jan. 15, 1999

(30) Foreign Application Priority Data

Jan. 16, 1998 (DE) .............................. 198 01 412

(51) Int. Cl.[7] .................................................. B29C 45/23
(52) U.S. Cl. ........................ 425/557; 425/562; 425/567; 425/568; 425/572
(58) Field of Search .................. 425/557, 558, 425/559, 562, 567, 568, 572

(56) References Cited

U.S. PATENT DOCUMENTS

| 3,001,233 | 9/1961 | Ernst . | |
|---|---|---|---|
| 4,370,122 | * 1/1983 | Dannels et al. | 425/572 |
| 5,069,840 | 12/1991 | Arnott | 264/69 |
| 5,538,410 | * 7/1996 | Yoo et al. | 425/572 |
| 6,017,210 | * 1/2000 | Takayama et al. | 425/557 |

FOREIGN PATENT DOCUMENTS

| 1778125 | 7/1971 | (DE) . |
| 2814285 | 10/1978 | (DE) . |
| 3510751 A1 | 9/1986 | (DE) . |

OTHER PUBLICATIONS

"Modulares Heibkanalsystem fur den universellen Einsatzl", Deutscher Verlag fur Brundstoffindustrie, Lipzlg stungart 1994.

* cited by examiner

*Primary Examiner*—Tim Heitbrink
(74) *Attorney, Agent, or Firm*—Blakely Sokoloff Taylor & Zafman

(57) ABSTRACT

The injection moulding machine has a plasticizing cylinder, arranged in whose interior there is a worm with an axial through-hole. The interior of the plasticizing cylinder is connected to a nozzle opening via a cylinder chamber. Operating in the cylinder chamber is a needle which extends through the through-hole in the worm and has a smaller diameter than the cylinder chamber. The tip of the worm constitutes, together with a correspondingly shaped sealing seat, a reverse flow barrier during the injection process. After the end of the injection process the worm is rotated and conveys plasticized plastic material in the direction towards the nozzle opening. As a result of the rising pressure in the worm threads the worm is pushed back and the plasticized material can penetrate into the annular space between the needle and the cylinder chamber. When the worm is rotated further, a pressure is also created in the annular space which slides the needle back into its starting position. It is possible to manufacture small and very small components with the aid of the invention with high reproducibility and without major technical expense.

44 Claims, 6 Drawing Sheets

INJECTION MOULDING MACHINE

1. FIELD OF THE INVENTION

The present invention relates to an injection moulding machine including a plasticizing cylinder, which is connected to at least one nozzle opening, and including a worm operating in the plasticizing cylinder.

2. DESCRIPTION OF THE PRIOR ART

Such injection moulding machines are used predominantly for processing thermoplastic materials. They currently operate on the worm thrust principle. Granular, plasticizable material is supplied to the plasticizing cylinder whilst the worm is rotating and is conveyed by the worm in the direction towards the nozzle opening. The plastic material melts under the pressure which is built up and optionally promoted by heating the plasticizing cylinder and at the same time the material is intensively mixed. During this process the worm moves increasingly away from the nozzle opening. As soon as the dosed amount of plastic material has liquefied, the worm is moved in the direction towards the nozzle opening, whereby the plastic material is injected through the nozzle opening into the mould. The machine is then ready for the next injection cycle.

It was previously problematic to manufacture small and very small components with such injection moulding machines. This is due to the fact that the diameter of the worm cannot be reduced indefinitely. If the diameter of the worm is too small the spaces in the worm threads in the inlet of the worm are filled to very different extents. This differential filling results in large variations in the dosing time which impair the quality of the liquefied material and the reproducibility of the entire injection cycle. The worm threads must consequently be adequately dimensioned in order to be able to accommodate substantially equal amounts of granular plastic material. Furthermore, strength considerations determine the size of the diameter of the core of the worm. The overall result of this is worms of relatively large diameter which currently have a minimum diameter of 14 millimeters. In order to inject smaller amounts of material, as are required for small and very small components, these known worms may only be moved through a minimal stroke. However, at minimal stroke the reproducibility of the process as regards the weight of the injected plastic composition is inadequate as a result of the given resolution of the controller and the mass moments of inertia etc. Small and very small components have for these reasons previously been produced with a large dead head which must be disposed of, principally as waste. The additional material consumption and the additional waste disposal costs are considerable.

It is the object of the invention to develop the injection moulding machine of the type referred to above so that the material consumption can be reduced when manufacturing small and very small components.

SUMMARY OF THE INVENTION

In order to solve this object the injection moulding machine referred to above is characterised in that formed upstream of the nozzle opening there is a cylinder chamber in which a needle-shaped piston element, preferably with a round cross-section, operates, the cross-sectional area of which is smaller than the cross-sectional area of the cylinder chamber, and that a reverse flow barrier is provided which separates the plasticizing cylinder from the cylinder chamber, when it is actuated.

The injection of the dosed amount of plastic material is thus no longer effected by the worm but instead by the needle-shaped piston element specially provided for this purpose. The plastic material is fed to the cylinder chamber already in liquid form so that no contribution to the preplasticization need be made at this point. Instead, this is taken care of by the worm whilst simultaneously intensively mixing the material.

Since the cross-sectional area of the needle-shaped piston element is smaller than the cross-sectional area of the cylinder chamber, the plasticized material moves during the dosing process past the piston element and creates a pressure in front of the piston element by which the piston element is pushed back. When the set travel has been reached, the reverse flow barrier is actuated and the needle-shaped piston element is moved a predetermined distance in the direction towards the nozzle opening, whereby it displaces the pre-dosed material. The reverse flow barrier prevents a proportion of the material being forced back into the plasticizing cylinder during the build up of the high injection pressure. During the injection process itself, the very advantageous First In-First Out effect is produced which prevents the material which is fed first being injected last and thus being overcooled or heated for too long when it reaches the nozzle.

The dimensions of the cylinder chamber and of the needle-shaped piston element can always be selected to be so small that dosing of small and very small amounts is possible with a reasonable piston stroke. Very small components with a weight of the order of significantly less than 0.1 g may be produced without difficulty.

A preferred embodiment of the invention is characterised in that the reverse flow barrier is defined by the tip of the worm and a correspondingly shaped sealing seat and that the worm is movable axially to a limited extent within the plasticizing cylinder.

If fresh material is processed in the plasticizing cylinder after termination of an injection process in this construction, the worm is forced back by the plasticized plastic material. This backward movement of the worm within the plasticizing cylinder is limited e.g. by the fact that a collar on the worm comes into contact with an abutment on the plasticizing cylinder. Its tip has come free from the sealing seat in this position so that plasticized material can flow into the cylinder chamber through the gap which is thus produced. The pressure created in the cylinder chamber then results in the needle-shaped piston element being pushed back. In the event that the opposing mass forces which occur are too large, an advantageous embodiment of the invention resides in the fact that the return movement of the worm and of the needle-shaped piston element is assisted by an external drive.

As soon as the cylinder has received the predetermined amount of plastic material, the worm is advanced. Its tip engages the sealing seat and thus seals the cylinder chamber. The reverse flow barrier can thus not influence the shot weight. The needle-shaped piston element is then moved forwardly and the liquid plastic material is forced through the nozzle opening into the mould.

A particularly advantageous embodiment of the invention is characterised in that the worm has an axial through-hole and that the piston element extends through the through-hole. Since the needle-shaped piston element is arranged in the previously unused interior of the worm, a particularly compact construction is produced. The space requirement of this embodiment is also minimal. A plurality of injection units can be arranged correspondingly closely next to one another in an injection moulding machine.

The space requirement of an injection unit can be further reduced if the plasticizing cylinder is connected to a plurality of cylinder chambers by means of a hot runner. Only one worm is thus required for the intensive mixing and plasticization of the material. The plasticized material flows via the hot runner to the different cylinder chambers. A respective needle-shaped piston element, which performs the actual injection process, is associated with the cylinder chambers.

One embodiment of the invention, which may be realised particularly simply technically, is characterised in that the cylinder chambers are arranged with their axes parallel to one another and that the hot runner extends perpendicular to the cylinder chambers.

A preferred embodiment of the invention is characterised by at least one central valve acting on the hot runner which separates at least two cylinder chambers from one another, when it is actuated. With a star-shaped arrangement of a plurality of cylinder chambers the central valve can simultaneously separate all the cylinder chambers from one another, if it is arranged in the centre. During the injection process all the cylinder chambers should be separated from one another, if possible, in order to prevent the individual injection processes interfering with one another. If all the cylinder chambers are separated it is also possible to operate the individual cylinder chambers with different pressures and to produce small components of different size.

A particularly simple and compact construction of the injection machine is produced if the worm has a through-hole and if a piston element, constituting the central valve, extends sealingly into the hot runner through the through-hole.

A more favourable drive for the translational movement of the worm is produced if the worm and/or the needle-shaped piston element is connected to the piston rod of a double-acting working piston machine. The working piston machine effects not only the movement of the worm in order to seal the plasticizing cylinder and the injection stroke of the piston element but can also assist the return movement of the worm or the piston element during filling of the at least one cylinder chamber.

A further embodiment of the invention resides in that the nozzle opening is arranged in a, preferably heatable, nozzle piece, whose central nozzle tip may be introduced into a tool. During the injection process the plasticized plastic material is forced through the nozzle opening in the direction towards the central, heated nozzle tip. The central nozzle tip makes it possible to make small components with a minimal dead head or with absolutely no dead head. The nozzle piece can advantageously also be provided with two or more nozzle openings.

A sealing device for sealing the nozzle piece with respect to the tool is preferably arranged upstream of the nozzle opening. The plasticized material discharging from the nozzle openings is thus deflected in the direction towards the heated nozzle tip.

A particularly good quality of the small plastic components can be achieved if the cylinder chamber and/or the plasticizing cylinder and/or the nozzle piece are heatable. The magnitude and variation of the temperature of the plasticized plastic material in the injection unit can thus be optimally matched to the plastic material to be injected and to the desired amount to be injected.

A preferred embodiment of the injection moulding machine in accordance with the invention is characterised by a hot runner nozzle connected downstream of the cylinder chamber.

Particularly small components of high quality may be produced if the plasticizing cylinder is connected to a device for supplying filamentary, plasticizable material. The filamentary material has the advantage by comparison with the previously used granular material that the worm threads can be filled more uniformly and completely. Furthermore, problems can arise when supplying granular material since bridges can form in the inlet region which impede the flow of material in the inlet region. Such problems are eliminated by the use of filamentary material.

The shape of the worm in the region of the supply device is advantageously matched to the cross-sectional shape of the filamentary material. The worm can thus be of very small construction since the worm threads can always be completely filled in the dosing process.

Further advantageous features of the invention are characterised in the dependent claims.

The invention will be described in more detail below by way of preferred embodiments in conjunction with the accompanying drawings.

DESCRIPTION OF THE PREFERRED EMBODIMENTS

Figure 1:
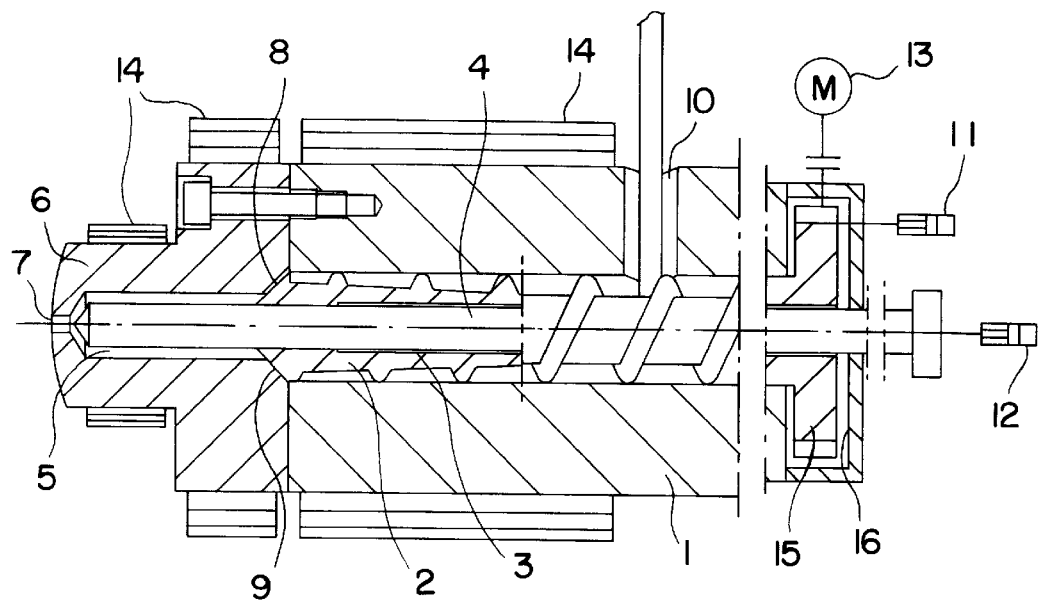
FIG. 1 is an axial sectional view of a first embodiment.
Figure 2:
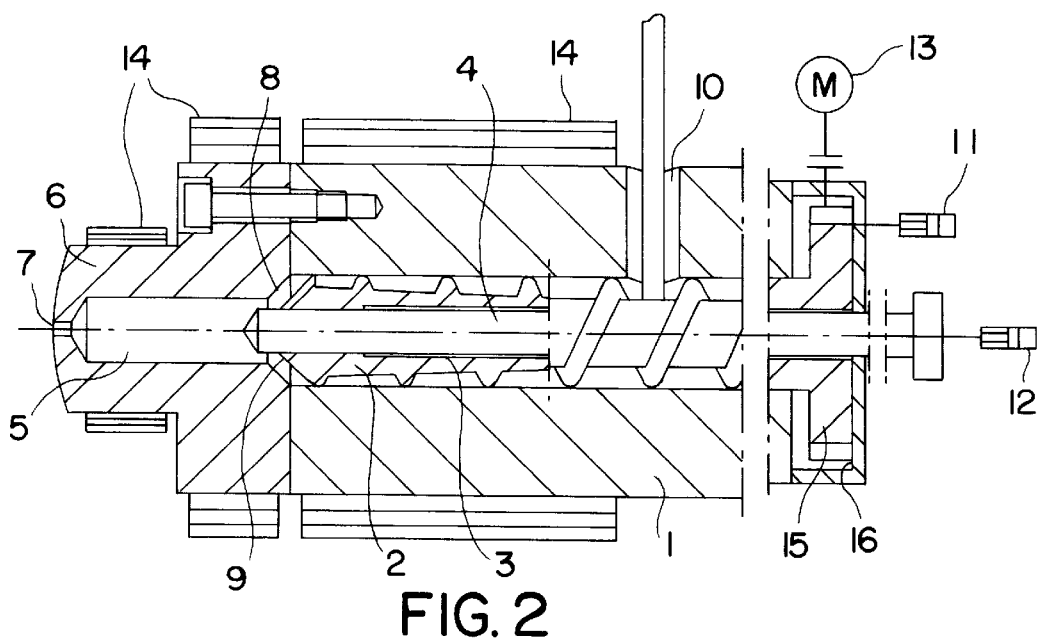
FIG. 2 is a sectional view corresponding to FIG. 1 in a different operational position.

The injection moulding machine shown in FIGS. 1 and 2 has a plasticizing cylinder 1 in which a worm 2 operates. The worm 2 has a through-hole 3 and is consequently constructed in the form of a tube. A needle 4 extends through the through-hole 3 into a cylinder chamber 5 in a housing 6. The housing 6 is provided with a nozzle opening 7. The end of the cylinder chamber 5 communicating with the interior of the plasticizing cylinder constitutes a sealing seat 8 which the correspondingly shaped tip 9 of the worm 2 can engage. Associated with the plasticizing cylinder 1 is also a device 10 for supplying filamentary plasticizable materials. Two double-acting working piston machines 11 and 12 and a rotary drive 13 are provided to actuate the worm 2 and the needle 4, respectively. Finally, the plasticizing cylinder 1 and the housing 6 are surrounded by a heater 14.

FIG. 1 shows the injection moulding machine directly after the end of an injection process. As may clearly be seen, the needle 4 is not pushed directly into the opening 7 but the injection stroke is so adjusted that a small cushion of material remains in front of the opening 7. The pre-plasticization of the plastic material then commences for the next injection process, filamentary plasticizing material being supplied to the worm 2 with the aid of the feed device 10. The worm 2 is rotated by means of its rotary drive 13. It transfers the material whilst liquefying and mixing it in the direction towards the nozzle opening 7, the tip 9 of the worm 2 moving away from the sealing seat 8 and defining an annular gap. The liquefied plastic material can enter the cylinder chamber 5 through this gap since the cross-sectional area of the cylinder chamber 5 is only partially filled by the needle 4. The worm 2 and the needle 4 move rearwardly into the position shown in FIG. 2 as a result of the pressure built up in the plasticizing cylinder and the cylinder chamber. The worm 2 cannot yield further to the pressure within the plasticizing cylinder 1 since it engages an abutment 16 on the plasticizing cylinder 1 with a collar 15. The rearward movement is also assisted by the double-acting working machines 11 and 12 so that the liquid plastics material need not be subjected to an impermissibly high pressure.

The next injection stroke begins in the position shown in FIG. 2, whereby the working piston machine 12 pushes the worm 2 forwardly. Its tip 9 engages the sealing seat 8 and thus separates the cylinder chamber 5 from the interior of the plasticizing cylinder 1. The tip 9 of the worm 2 together with the sealing seat 8 thus constitute a reverse flow barrier. The working piston machine 11 then pushes the needle 4 forwardly, whereby a large proportion of the molten plastics material contained in the cylinder chamber 5 is forced out of the nozzle opening 7 on a First In-First Out basis.

The diameter of the device 10 for supplying filamentary plasticizable material, the diameter and stroke of the needle 4 and the diameter of the cylinder chamber 5 are so matched that small components and even very small components can be injection moulded with the necessary reproducibility as regards the amount of plastic that is injected and its quality.

Figure 3:
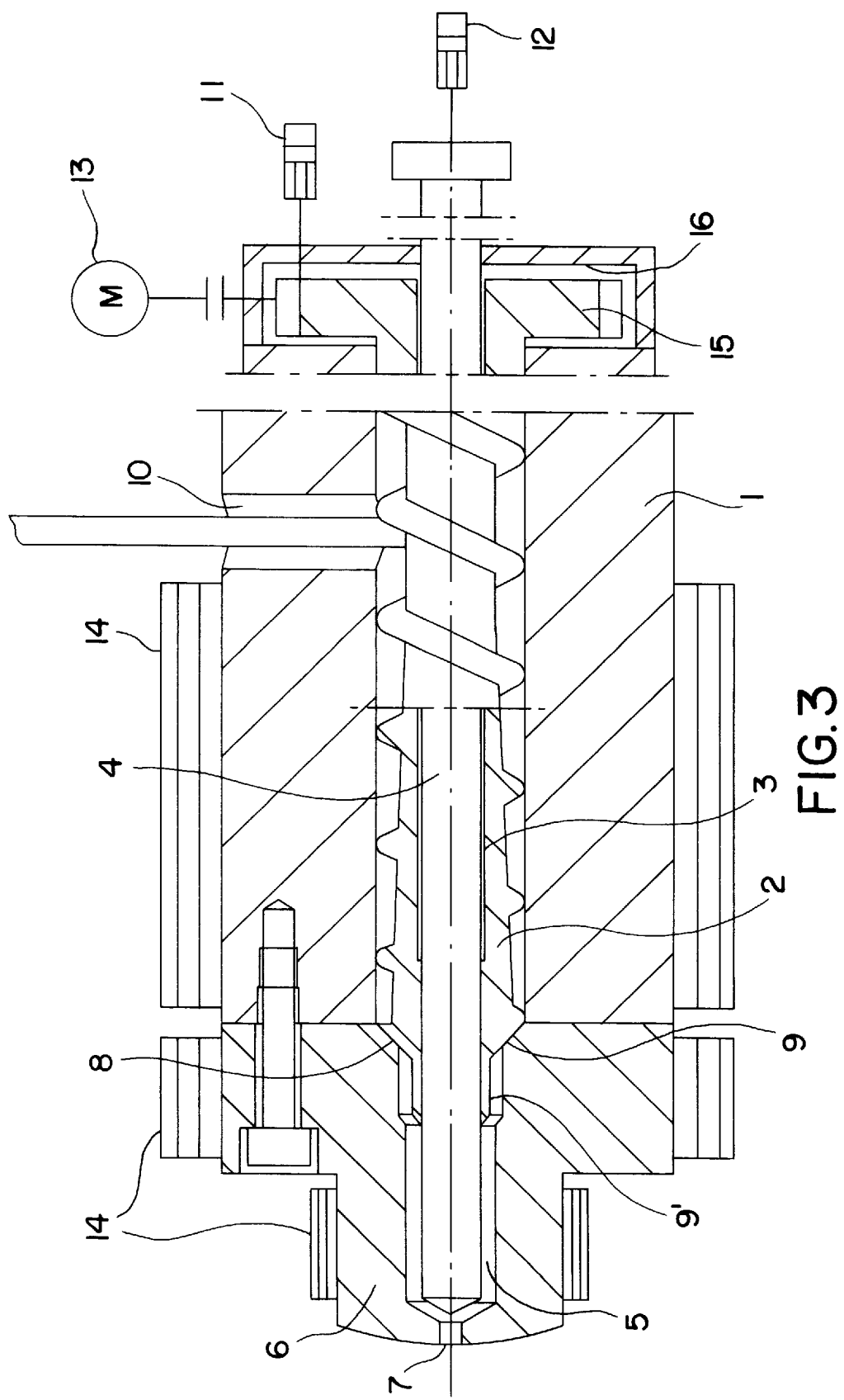
FIG. 3 is an axial sectional view of a second embodiment.

In the modified embodiment of FIG. 3 the tip 9 of the worm 2 is provided with a sealing lip extension 9'. Furthermore, the cylinder chamber 5 is broadened downstream of the sealing seat 8.

During injection, the tip 9 of the worm 2 engages the sealing seat 8, as shown in FIG. 3. The needle 4 is then slid forwardly, whereby a pressure of up to 2000 bar and above is created in the cylinder chamber 5. The sealing lip extension 9' is pressed by this pressure against the needle 4 with a high force. The broadened portion of the cylinder chamber 5 ensures that plastic material flows completely around the sealing lip and the pressure acts on the entire surface area of the sealing lip extension 9'. The risk of leaks between the needle 4 and the worm 2 can be minimised in this manner.

Figure 4:
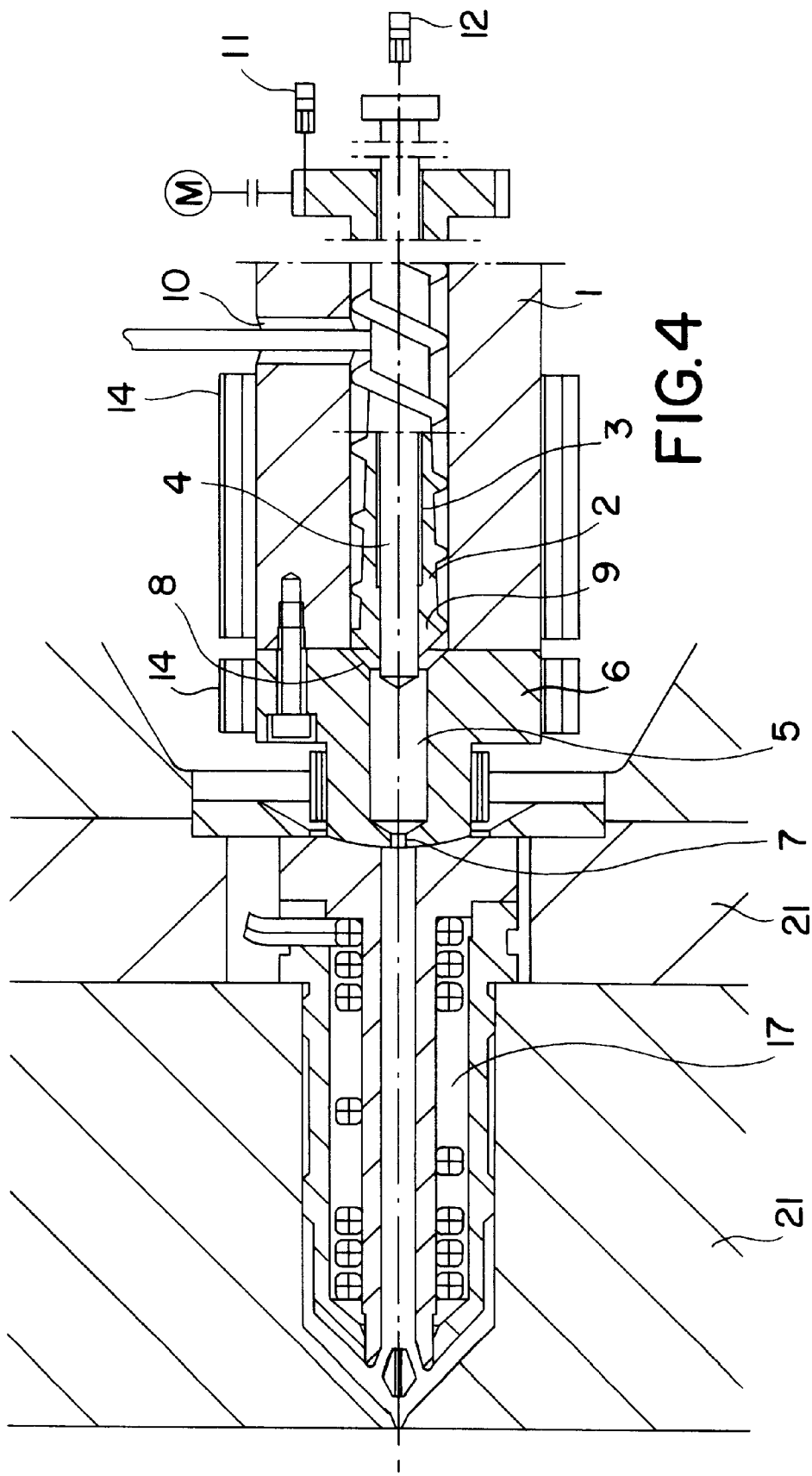
FIG. 4 is an axial sectional view of a third embodiment.

A further embodiment is shown in FIG. 4. The nozzle opening 7 is connected to a hot runner nozzle 17. The dead head can thus be minimised which is of particular significance with extremely small injection masses.

Figure 5:
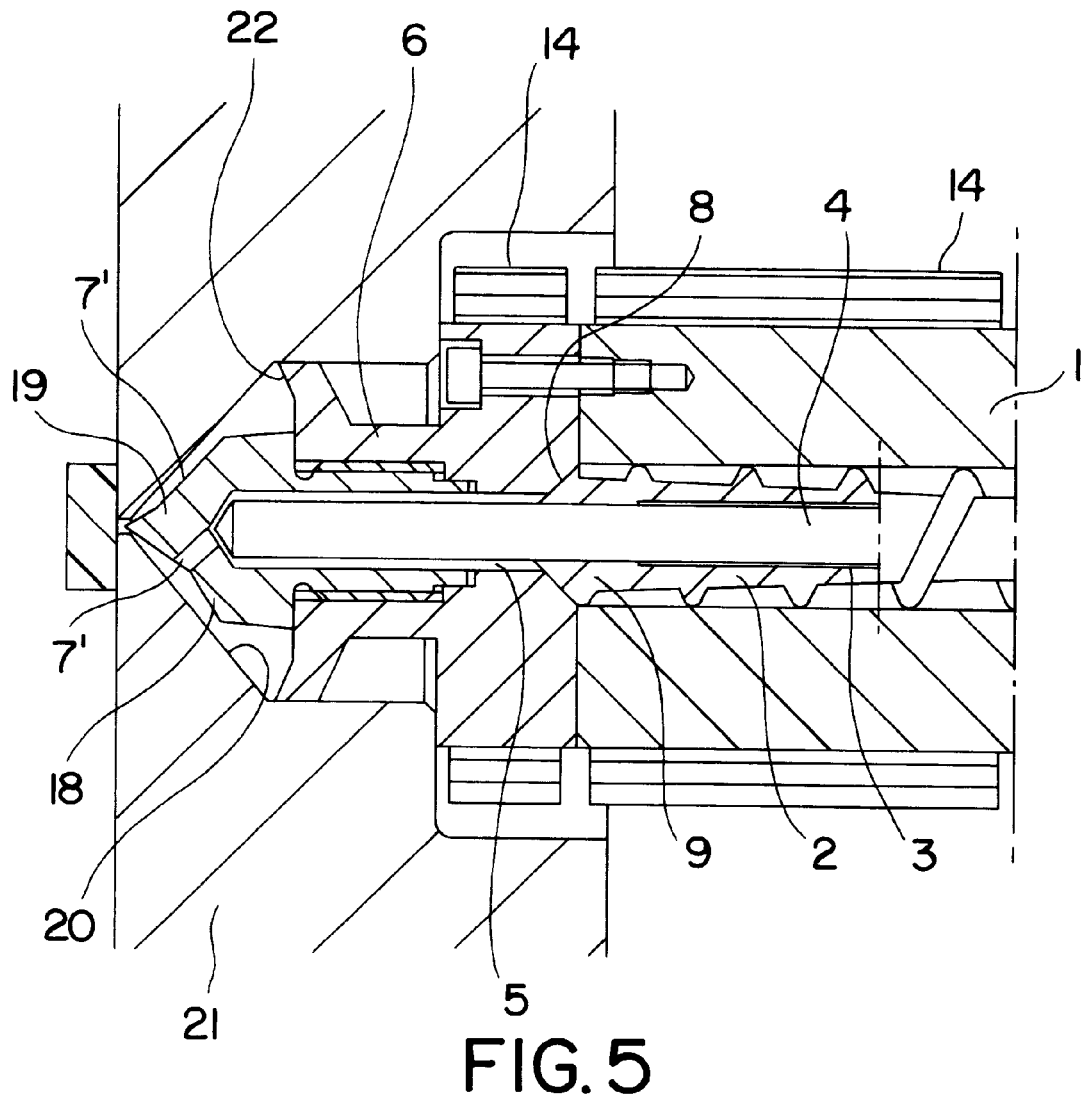
FIG. 5 is an axial sectional view of a fourth embodiment.

A further embodiment is shown in FIG. 5. In this embodiment, two nozzle openings 7' are arranged in a nozzle piece 18 screwed into the housing 6. The nozzle piece 18 has a central nozzle tip 19. In the operational position, the nozzle piece 18 is introduced so far into a conical opening 20 in a tool 21 that the central nozzle tip 19 extends into the conical tip of the opening 20. In the actual injection process the plasticized plastic material is forced through the nozzle opening 7' into the conical opening 20. A housing flange 22 seals the housing 6 from the conical opening 20 and ensures that the plasticized plastic material is injected into the injection mould along the central nozzle tip 19.

Small and very small components can also be manufactured with injection moulding machines in accordance with this embodiment with a minimal dead head or wholly without a dead head.

Figure 6:
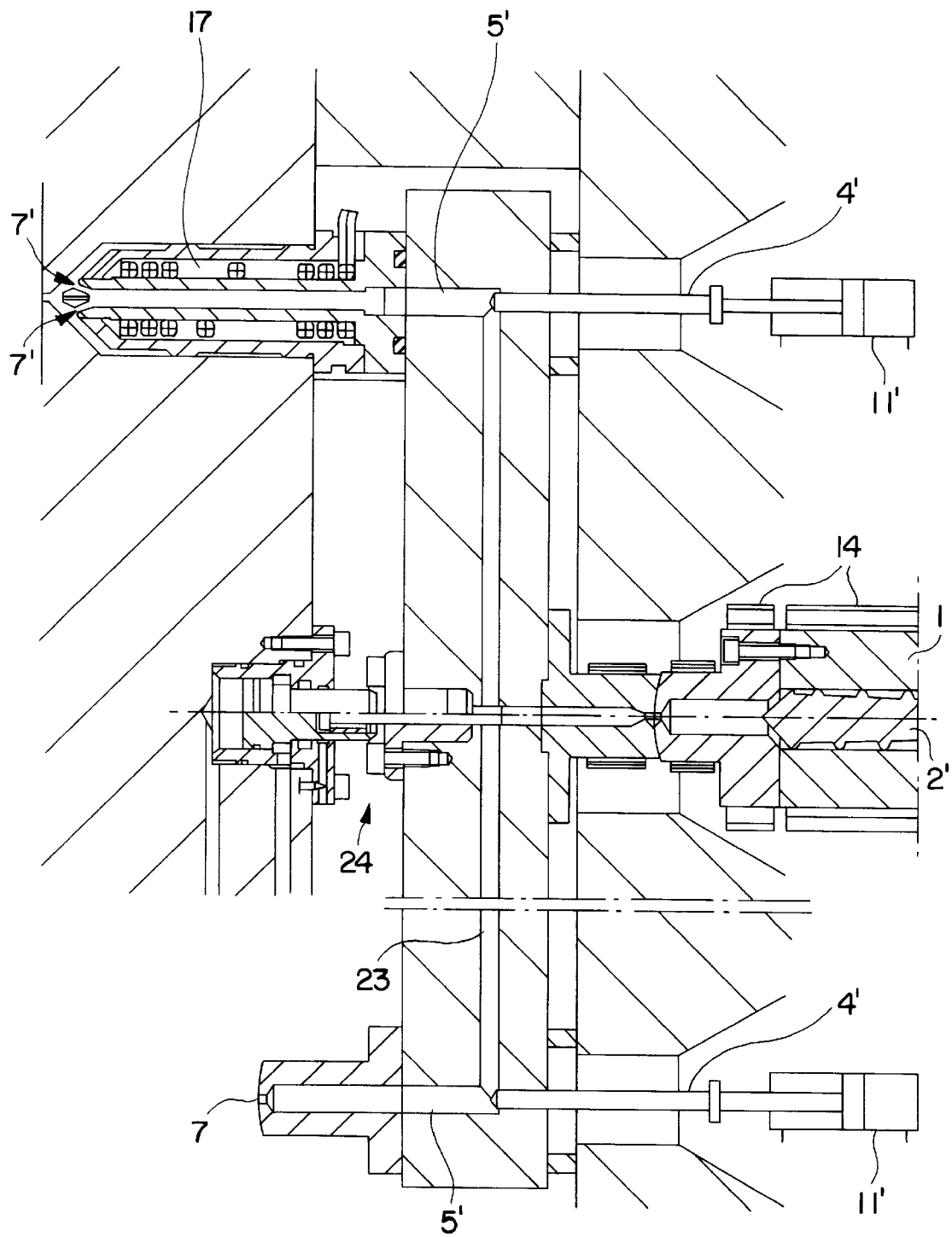
FIG. 6 is an axial sectional view of a fifth embodiment.

A further embodiment of the invention is illustrated in FIG. 6 in the position prior to injection. In this embodiment, a massive worm 2' is connected to a rotary drive 13 but not to a working piston machine. The interior of the plasticizing cylinder 1 is connected to a hot runner 23 extending perpendicular to the plasticizing cylinder. Connected to the hot runner 34 are two cylinder chambers 5'. Associated with the cylinder chambers 5' are respective needles 4' which are both movable with the aid of a working piston machine 11'. The cylinder chamber 5', which is shown only schematically at the bottom, is provided with a nozzle opening 7. Connected to the cylinder chamber 5', which is shown at the top, is a hot runner nozzle with two nozzle openings 7'. A central valve 24 is provided approximately in the centre of the hot runner 23.

At the end of the injection process the needles 4' are situated in the cylinder chambers 5'. A new injection process then begins with the preplasticization of plastic material, whereby the worm 2' is rotated by means of its rotary drive 13. The worm conveys the material in the direction towards the hot runner 23. The central valve 24 is open in this operational state so that the plasticized plastic material can flow into the hot runner 23. Since the diameter of the needles 4' is again smaller than the diameter of the interior of the cylinder chambers 5', the plasticized plastic material is forced past the needles 4' into the cylinder chambers 5'. As a result of the pressure which is created in the cylinder chambers 5', the needles 4' are slid back into the position shown in FIG. 5. The central valve 24 is then closed in order to prevent the injection processes performed with the aid of the two cylinder chambers 5' influencing one another. The needles 4' are then moved with the aid of the associated working piston machines 11' in the direction towards the associated nozzle openings 7 and 7'. The volume displaced by the injection stroke of the needles 4' can escape only via the nozzle openings 7 and 7' due to the central valve 24. After termination of the injection process the central valve 24 is opened and new plastic material is again conveyed into the cylinder chambers 5' with the aid of the worm 2'.

This exemplary embodiment has the advantage that nearly as many needles and cylinder chambers can be used as desired so that a plurality of plastics components can be injection moulded simultaneously. The residence time of the plasticized plastic material in the system can be minimised if filamentary plastic material is supplied to the worm and if the dimensions of the worm are minimised to the greatest extent possible. Since all the needles and cylinder chambers can be differently constructed, small components of different size and different weight can be injection moulded simultaneously with one injection moulding machine. Furthermore, the injection moulding machine can ensure extremely high reproducibility since the needles are arranged in the immediate vicinity of the dead head.

Figure 7:
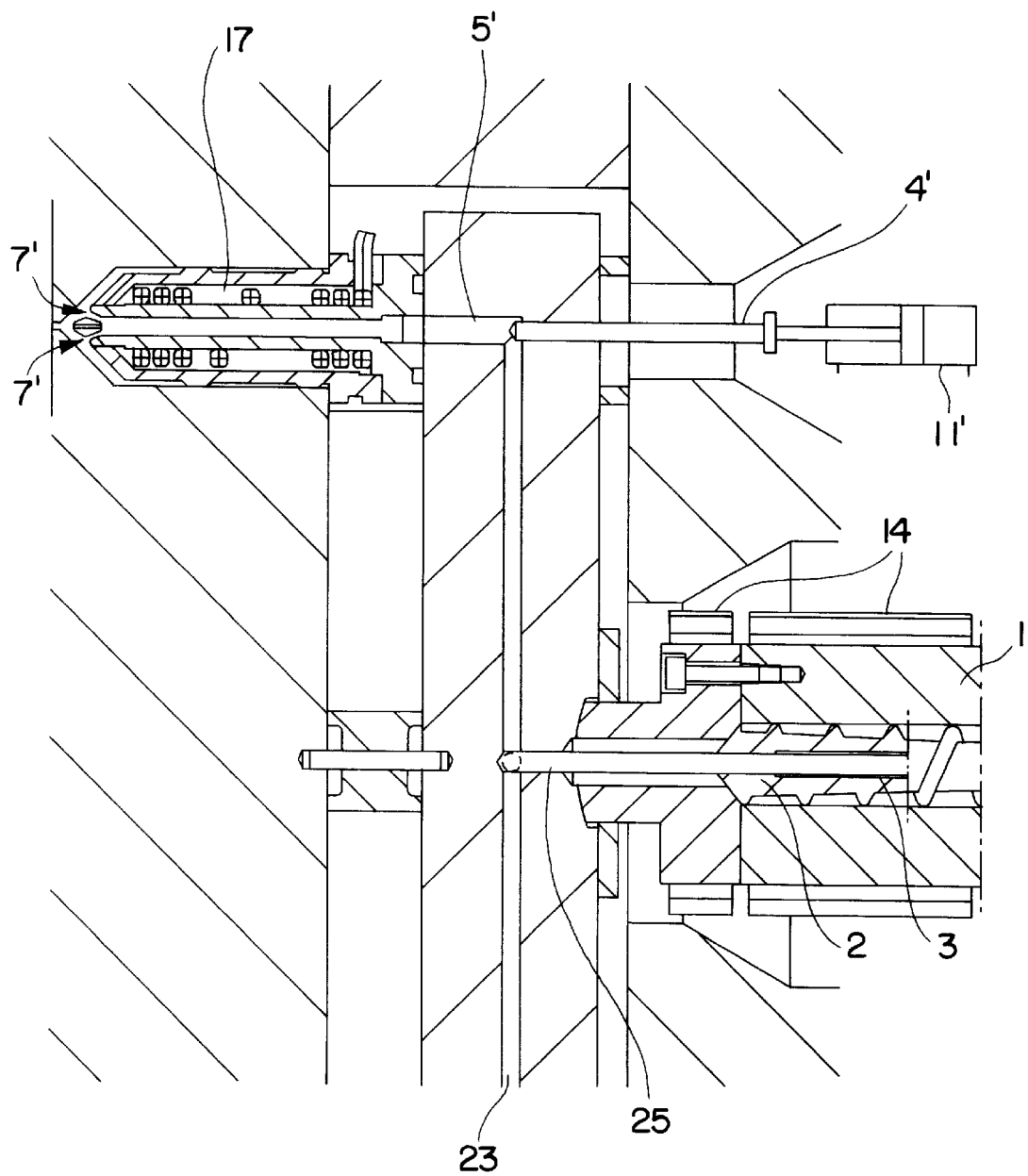
FIG. 7 is an axial sectional view of a sixth embodiment.

FIG. 7 shows a further embodiment of the invention, only one of a number of cylinder chambers 5 being shown for reasons of clarity. The embodiment of FIG. 7 differs from the embodiment of FIG. 6 in that the worm 2 is provided, as in FIGS. 1 to 4, with a through-hole 3 and that the central valve is constituted by a piston element 25 which extends through the through-hole 3.

The worm 2 must have somewhat larger dimensions in this embodiment as a result of the integrated piston element 25. The embodiment thus has the advantage that it is substantially more compact.

Modifications are certainly possible within the scope of the invention. The relative positions of the plasticizing cylinder, needle-shaped piston element and cylinder chamber can be selected to be different. The shape and path of the hot runner can be varied at will. The illustrated working piston machines are particularly advantageous but can also be replaced by other translational drives. Instead of the double acting working piston machines in the embodiments of FIGS. 1 to 3, single acting working piston machines can equally be used. Furthermore, nozzle pieces with a plurality of nozzle openings can be used such that a plurality of components can be produced with one nozzle piece.

What is claimed is:

1. An injection moulding machine, comprising:
    a plasticizing cylinder;
    at least one nozzle opening coupled to the plasticizing cylinder;
    a worm disposed to operate in the plasticizing cylinder, the worm having an axial through-hole;
    at least one cylinder chamber disposed upstream of the at least one nozzle opening, the at least one cylinder chamber defining a cross-sectional area;
    a needle shaped piston element disposed through the axial through-hole and disposed to operate in the cylinder chamber, wherein the needle shaped piston element defines a cross-sectional area that is smaller than the cross-sectional area of the at least one cylinder chamber; and
    a reverse flow barrier disposed between the plasticizing cylinder and the at least one cylinder chamber so as to separate the plasticizing cylinder from the at least one cylinder chamber when the reverse flow barrier is actuated.

2. The injection moulding machine of claim 1, wherein the cross-sectional area of the needle shaped piston element defines a circular shape.

3. The injection moulding machine of claim 1, wherein the worm has a tip, wherein the reverse flow barrier includes the worm tip and a sealing seat that is correspondingly shaped to the worm tip, and wherein the worm is adapted to be moved axially to a limited extent within the plasticizing cylinder.

4. The injection moulding machine of claim 3, wherein the worm tip includes a sealing lip extension.

5. The injection moulding machine of claim 4, wherein the at least one cylinder chamber is broadened upstream of the sealing seat.

6. The injection moulding machine of claim 1, further comprising:
    a double-acting working piston machine having a piston rod, wherein the worm is connected to the piston rod.

7. The injection moulding machine of claim 1, further comprising:
    a double-acting working piston machine having a piston rod, wherein the needle-shaped piston element is connected to the piston rod.

8. The injection moulding machine of claim 1, further comprising:
    a nozzle piece having a central nozzle tip; and
    wherein the nozzle opening is disposed in the nozzle piece and the central nozzle tip is disposed to be introduced into the tool.

9. The injection moulding machine of claim 8, wherein the nozzle piece is adapted to be heated.

10. The injection moulding machine of claim 8, further comprising:
    means for sealing the nozzle piece with respect to the tool, wherein the means for sealing are disposed upstream of the nozzle opening.

11. The injection moulding machine of claim 1, wherein the at least one cylinder chamber is adapted to be heated.

12. The injection moulding machine of claim 1, wherein the plasticizing cylinder is adapted to be heated.

13. The injection moulding machine of claim 1, further comprising:
    a hot runner nozzle coupled to the cylinder chamber at a location that is downstream of the cylinder chamber.

14. The injection moulding machine of claim 1, further comprising:
    means for supplying a filamentary, plasticizble material to the plasticizing cylinder, wherein the means for supplying is coupled to the plasticizing cylinder.

15. The injection moulding machine of claim 14, wherein the filamentary, plastizable material defines a cross-section and wherein a perimeter of the worm follows the cross-section of the filamentary, plastizable material in a region of the means for supplying.

16. An injection moulding machine comprising:
    a plasticizing cylinder;
    at least one nozzle opening coupled to the plasticizing cylinder;
    a worm disposed to operate in the plasticizing cylinder, the worm having a through-hole;
    a hot runner;
    a plurality of cylinder chambers disposed upstream of the at least one nozzle opening, wherein each of the plurality of cylinder chambers defines a cross-sectional area, wherein the plurality of cylinder chambers are coupled to the plasticizing cylinder by the hot runner, wherein the hot runner includes a central valve that is disposed between two cylinder chambers so as to separate the two cylinder chambers from one another when the central valve is actuated;
    a needle shaped piston element disposed to operate in the cylinder chamber, wherein the needle shaped piston element defines a cross-sectional area that is smaller than each cylinder chamber cross-sectional area;
    a reverse flow barrier disposed between the plasticizing cylinder and the plurality of cylinder chambers so as to separate the plasticizing cylinder from the at least one cylinder chamber when the reverse flow barrier is actuated; and
    a piston device disposed in the worm through-hole so as to sealingly engage in the hot runner as the central valve.

17. The injection moulding machine of claim 16, wherein the cross-sectional area of the needle shaped piston element defines a circular shape.

18. The injection moulding machine of claim 16, wherein the worm has a tip, wherein the reverse flow barrier includes the worm tip and a sealing seat that is correspondingly shaped to the worm tip, and wherein the worm is adapted to be moved axially to a limited extent within the plasticizing cylinder.

19. The injection moulding machine of claim 16, each cylinder chamber defining an axis, wherein each cylinder chamber axis is parallel the remaining cylinder chamber axes and wherein the hot runner extends perpendicular to a cylinder chamber axis.

20. The injection moulding machine of claim 16, further comprising:
    a double-acting working piston machine having a piston rod, wherein the worm is connected to the piston rod.

21. The injection moulding machine of claim 16, further comprising:
    a double-acting working piston machine having a piston rod, wherein the needle-shaped piston element is connected to the piston rod.

22. The injection moulding machine of claim 16, further comprising:
a nozzle piece having a central nozzle tip; and
wherein the nozzle opening is disposed in the nozzle piece and the central nozzle tip is disposed to be introduced into the tool.

23. The injection moulding machine of claim 22, wherein the nozzle piece is adapted to be heated.

24. The injection moulding machine of claim 22, further comprising:
means for sealing the nozzle piece with respect to the tool, wherein the means for sealing are disposed upstream of the nozzle opening.

25. The injection moulding machine of claim 16, wherein each of the plurality of cylinder chambers is adapted to be heated.

26. The injection moulding machine of claim 16, wherein the plasticizing cylinder is adapted to be heated.

27. The injection moulding machine of claim 16, wherein a hot runner nozzle is coupled to the cylinder chamber at a location that is downstream of the cylinder chamber.

28. The injection moulding machine of claim 16, further comprising:
means for supplying a filamentary, plasticizble material to the plasticizing cylinder, wherein the means for supplying is coupled to the plasticizing cylinder.

29. The injection moulding machine of claim 28, wherein the filamentary, plastizable material defines a cross-section and wherein a perimeter of the worm follows the cross-section of the filamentary, plastizable material in a region of the means for supplying.

30. An injection moulding machine, comprising:
a plasticizing cylinder;
at least one nozzle opening coupled to the plasticizing cylinder;
a worm disposed to operate in the plasticizing cylinder, the worm having a tip;
at least one cylinder chamber disposed upstream of the at least one nozzle opening, the at least one cylinder chamber defining a cross-sectional area;
a needle shaped piston element and disposed to operate in the cylinder chamber, wherein the needle shaped piston element defines a cross-sectional area that is smaller than the cross-sectional area of the at least one cylinder chamber; and
a reverse flow barrier disposed between the plasticizing cylinder and the at least one cylinder chamber so as to separate the plasticizing cylinder from the at least one cylinder chamber when the reverse flow barrier is actuated,
wherein the reverse flow barrier includes the worm tip and a sealing seat that is correspondingly shaped to the worm tip, wherein the worm is adapted to be moved axially to a limited extent within the plasticizing cylinder, and wherein the sealing seat is disposed at an upstream positioned end of the cylinder chamber.

31. The injection moulding machine of claim 30, wherein the cross-sectional area of the needle shaped piston element defines a circular shape.

32. The injection moulding machine of claim 30, the worm having an axial through-hole, wherein the needle shaped piston element is disposed through the axial through-hole.

33. The injection moulding machine of claim 32, wherein the worm tip includes a sealing lip extension.

34. The injection moulding machine of claim 33, wherein the at least one cylinder chamber is broadened upstream of the sealing seat.

35. The injection moulding machine of claim 30, further comprising:
a double-acting working piston machine having a piston rod, wherein the worm is connected to the piston rod.

36. The injection moulding machine of claim 30, further comprising:
a double-acting working piston machine having a piston rod, wherein the needle-shaped piston element is connected to the piston rod.

37. The injection moulding machine of claim 30, further comprising:
a nozzle piece having a central nozzle tip; and
wherein the nozzle opening is disposed in the nozzle piece and the central nozzle tip is disposed to be introduced into the tool.

38. The injection moulding machine of claim 37, wherein the nozzle piece is adapted to be heated.

39. The injection moulding machine of claim 37, further comprising:
means for sealing the nozzle piece with respect to the tool, wherein the means for sealing are disposed upstream of the nozzle opening.

40. The injection moulding machine of claim 30, wherein the at least one cylinder chamber is adapted to be heated.

41. The injection moulding machine of claim 30, wherein the plasticizing cylinder is adapted to be heated.

42. The injection moulding machine of claim 30, further comprising:
a hot runner nozzle coupled to the cylinder chamber at a location that is downstream of the cylinder chamber.

43. The injection moulding machine of claim 30, further comprising:
means for supplying a filamentary, plasticizble material to the plasticizing cylinder, wherein the means for supplying is coupled to the plasticizing cylinder.

44. The injection moulding machine of claim 43, wherein the filamentary, plastizable material defines a cross-section and wherein a perimeter of the worm follows the cross-section of the filamentary, plastizable material in a region of the means for supplying.

* * * * *